United States Patent [19]

Hautemont

[11] Patent Number: 4,854,850
[45] Date of Patent: Aug. 8, 1989

[54] DEVICE FOR PRODUCING AND POSITIONING A LABEL ON A THERMOFORMED CONTAINER

[75] Inventor: Jean-Claude Hautemont, Gif sur Yvette, France

[73] Assignee: Erca Holding, Les Ulis, France

[21] Appl. No.: 72,687

[22] Filed: Jul. 13, 1987

[30] Foreign Application Priority Data

Jul. 16, 1986 [FR] France ............................. 86 10361

[51] Int. Cl.⁴ .......................................... B29C 51/16
[52] U.S. Cl. ..................................... 425/503; 264/509; 264/510; 264/551; 425/122; 425/125; 425/126.1; 425/301; 425/306; 425/388; 425/443; 425/510
[58] Field of Search ............... 425/503, 504, 508, 510, 425/512, 513, 521, 112, 122, 125, 126.1, 142, 301, 302.1, 305.1, 306, 388, 538, 290, 291, 443; 264/509, 510, 544, 550, 551, 132, 146, 160, 259

[56] References Cited

U.S. PATENT DOCUMENTS

| | | | |
|---|---|---|---|
| 3,684,418 | 8/1972 | Langecker | 425/122 |
| 3,709,643 | 1/1973 | Nasica | 425/122 |
| 3,827,128 | 8/1974 | Nasica | 29/421 |
| 4,134,717 | 1/1979 | Philippon et al. | 425/305.1 |
| 4,370,118 | 1/1983 | Dronet | 425/305.1 |
| 4,391,115 | 7/1983 | Dronet | 264/509 |
| 4,452,580 | 6/1984 | Dronet | 425/503 |
| 4,512,734 | 4/1985 | Dronet et al. | 425/513 |
| 4,591,327 | 5/1986 | Hautemont | 425/306 |
| 4,734,026 | 3/1988 | Hautemont | 425/306 |

FOREIGN PATENT DOCUMENTS

| | | | |
|---|---|---|---|
| 1704091 | 5/1971 | Fed. Rep. of Germany. | |
| 2365028 | 7/1975 | Fed. Rep. of Germany | 264/132 |
| 1593083 | 7/1970 | France. | |
| 2034915 | 12/1970 | France. | |
| 2403177 | 4/1979 | France. | |
| 2425926 | 12/1979 | France. | |

*Primary Examiner*—James Housel
*Attorney, Agent, or Firm*—Dennison, Meserole, Pollack & Scheiner

[57] ABSTRACT

The invention relates to a device for producing and positioning a label on a thermoformed container. The device includes, inside a thermoforming station including a molding unit, at least one row of upwardly open forming chambers, a vertically movable supporting table supporting the molding unit, an individual band of labels for every forming chamber, means for at least partially cutting the labels in order to detach them from their individual band, a storage roll of master band mounted in fixed bearings, a cutting unit for cutting the master band longitudinally, a supporting table on which is installed the longitudinal cutting unit, and a tension roller applied against the master band.

12 Claims, 3 Drawing Sheets

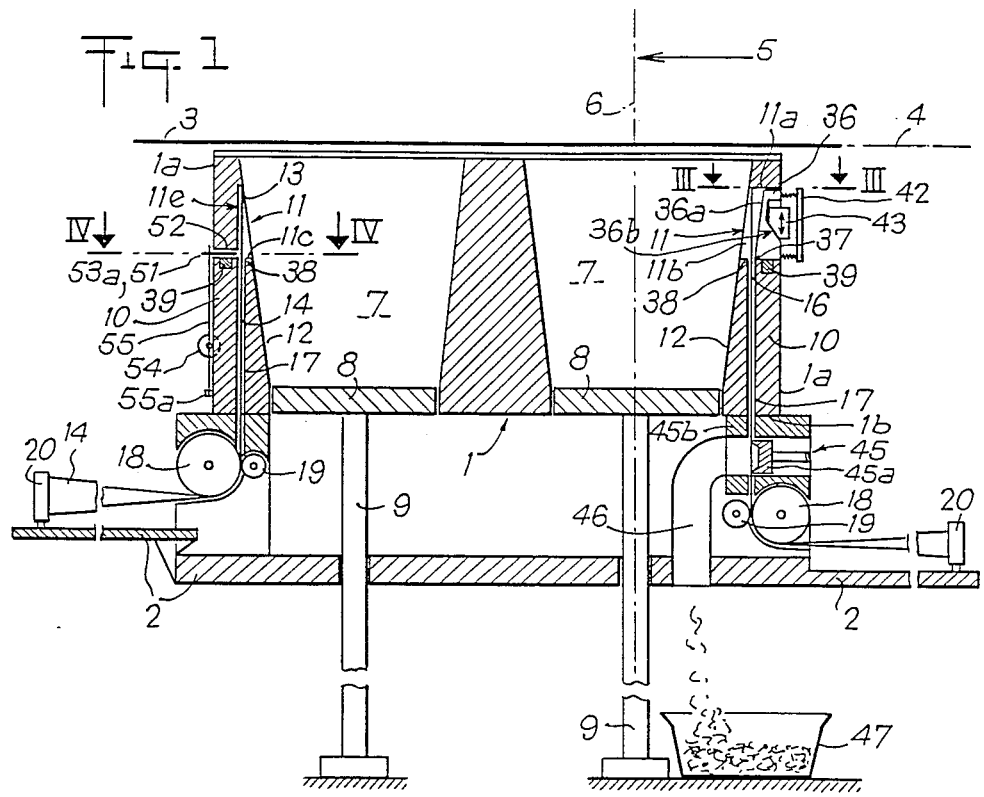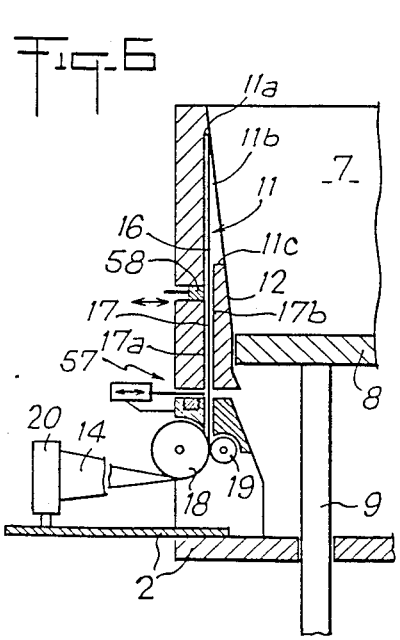

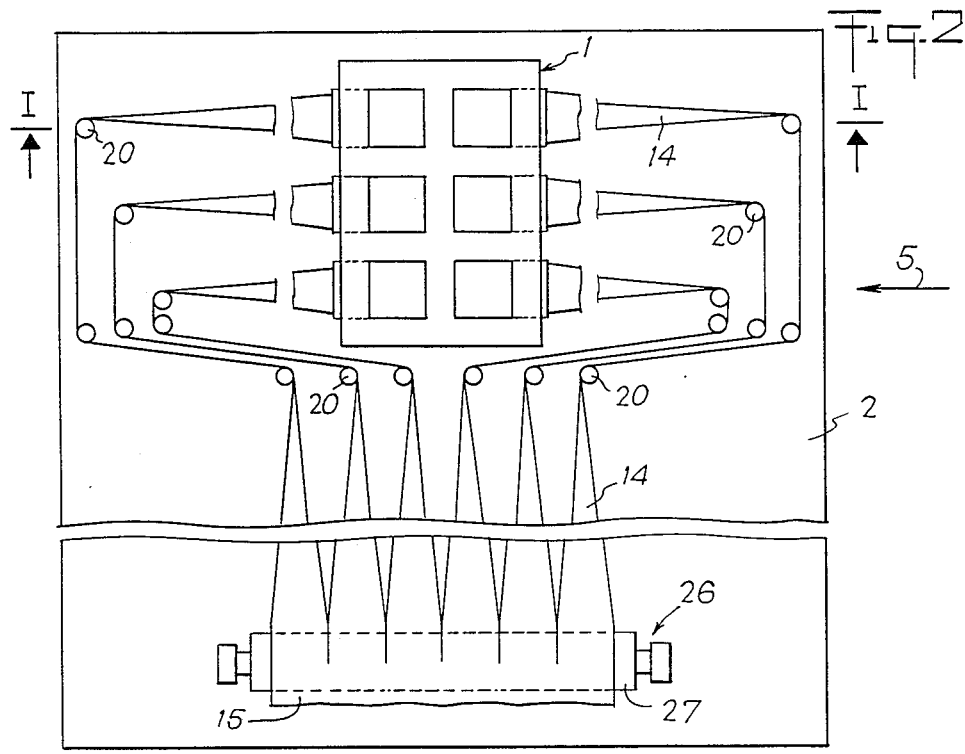
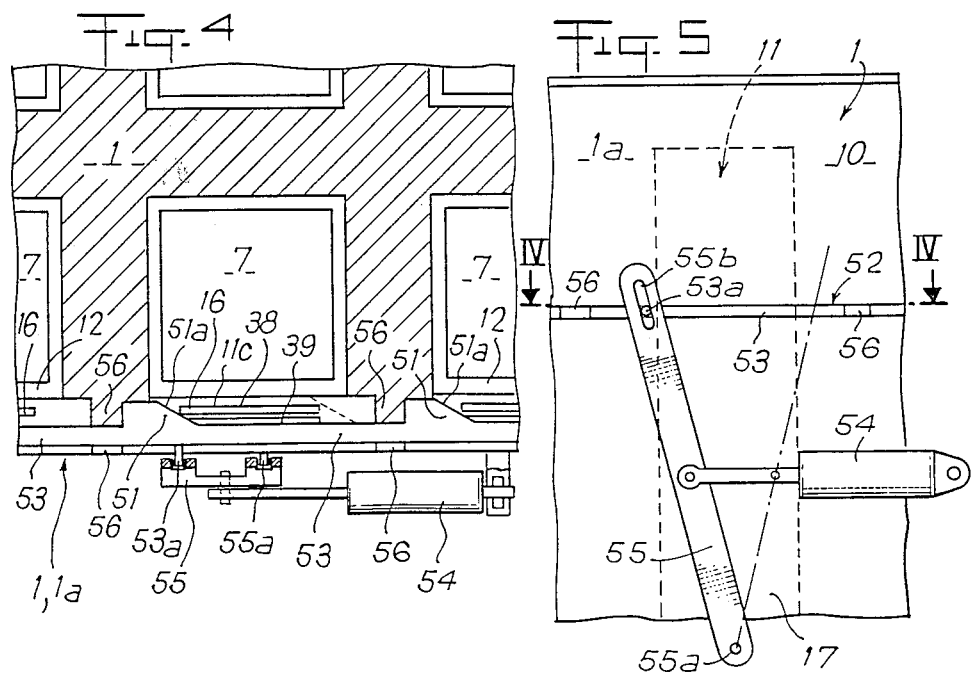

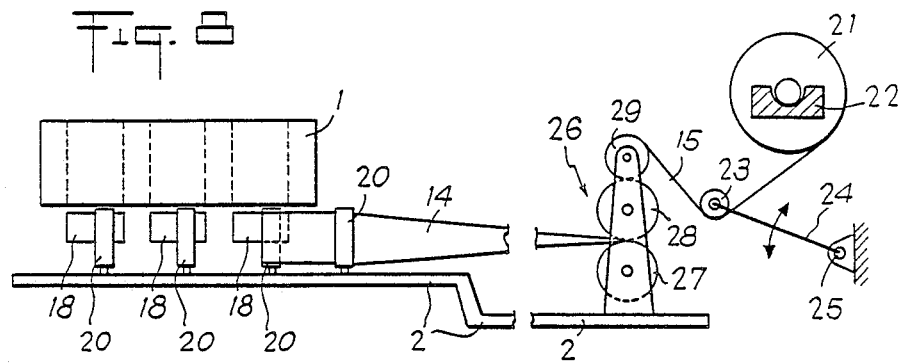
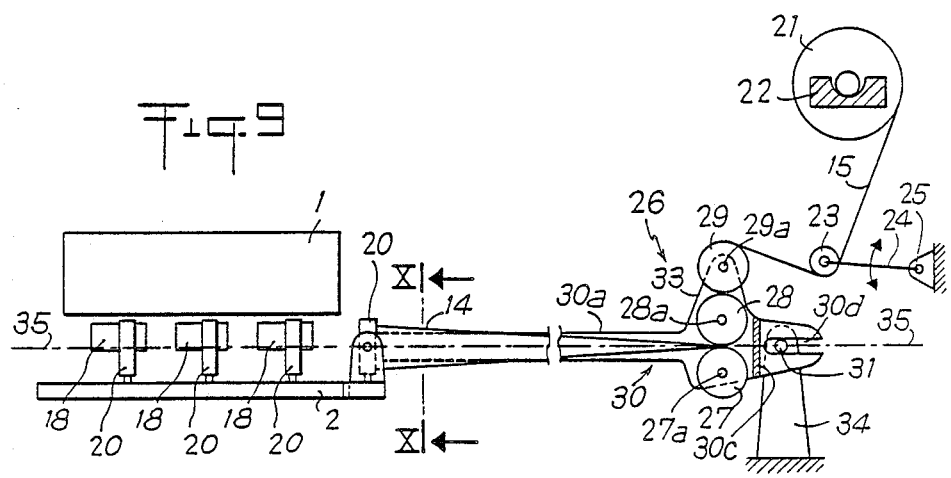
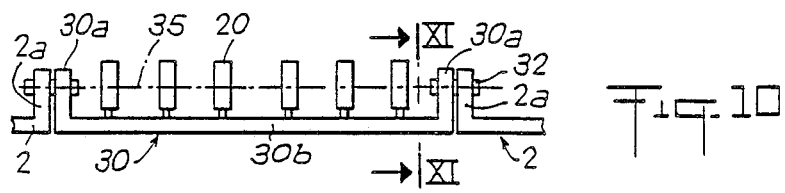
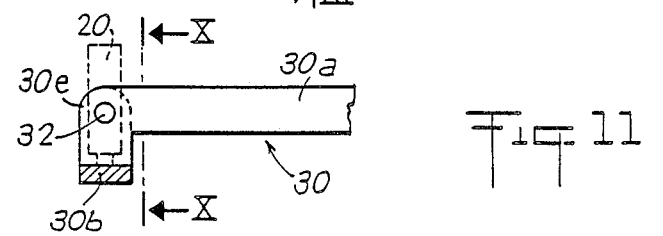

DEVICE FOR PRODUCING AND POSITIONING A LABEL ON A THERMOFORMED CONTAINER

FIELD OF THE INVENTION

The invention relates to a method and device for producing and positioning a label on a thermoformed container from a thermoplastic band, of the type consisting in using a band of labels, detaching, at least partly, one label from said band of labels, transporting the at least partly detached label, into the forming chamber of a mold, by introducing it through at least part of the side wall of the mold, and fixing the label on the container during the container thermoforming operation.

BACKGROUND OF THE INVENTION

In a method of this type, known for example from German Patent Application 1 704 091, it is provided to use, for every mold, an individual band of labels from which a label is cut by means of a die constituted by the edge of an access opening provided in the lateral wall of one half-mold and by means of a transversely movable punch, when the two half-molds are spaced apart to allow the passage of the container which has been thermoformed and when one of the half-molds is applied against the band of labels, the punch then stamping a label while transferring it towards the internal lateral face of the forming chamber of the half-mold and accompanying, in that position, the half-mold until the two half-molds are joined together. This manner of proceeding presents many disadvantages among which that of having to return the punch to its initial position rather far from the joining up position of the two half-molds, before the band of labels is released from said punch and can be moved forward one step. Another disadvantage resides in the stamping itself of the labels in the area of the access opening, this producing, after the stamping, a fragile grate-like pattern which, moreover, is used for transmitting to the band of labels the pulling force which controls the forward motion of the band. In this particular case, the label band moves according to a fixed path and it is the half-mold which is brought close to that path for the stamping operation.

To overcome, at least partly, this disadvantage, it has been proposed to make part of the path of a band fast with a half-mold and to associate all the labels stamping means to said mold (see for example U.S. Pat. No. 3,684,418). However, this also produces a fragile grate-like pattern and the punch prevents the label, band or strip from moving forward as long as said punch has not returned to its initial position.

Another disadvantage of the two known methods resides in the use of individual bands of labels, so that when simultaneously thermoforming several containers, it is difficult, if not impossible, to control with accuracy, with simple means, that all the bands move simultaneously the same length of step. This disadvantage has, on the whole, already been eliminated by either one of two similar proposals made for example in French Patents 2 034 915 and 2 403 117 whereby individual bands of labels are produced from a master band common to several individual bands and the moving step of all the individual bands is determined at the level of the cutting of the master band whereas a pair of feeding rollers is associated with each of the individual bands, the periphery laying out length of which rollers is more than the length of one step at the level of the cutting of the master band so that said rollers begin to slip when they have absorbed the length of a one-step forward motion given by the master band. It is easy to understand that this manner of proceeding cannot be applied to the known individual bands because the grate-like patterns, resulting from the stamping of the bands, would tear. This known control method cannot be used with molds composed of two horizontally moving half-molds and even less with molds that are vertically movable and of which the forming chambers are open upwardly and have a bottom which is either fixed or vertically movable, but which, in any case, is independent of the lateral wall of the forming chambers, due to the fact that in all these known systems, the length of the path of an individual band counted between the master band cutting zone and the pair of rollers advancing the individual band associated with a forming chamber, varies between two extreme values corresponding to an upper forming position and to a lower stripping position.

Yet another major disadvantage of the known methods resides in the fact that they do not permit the manufacture of two close together rows of containers from a horizontal thermoplastic band moving stepwise in a direction perpendicular to the plane traversing the axes of the containers of a container row.

SUMMARY OF THE INVENTION

It is the object of the present invention to eliminate the aforesaid disadvantages.

In a method for simultaneously producing and positioning a plurality of labels on the containers of at least one row of thermoformed containers, of the type consisting in:

using as many individual label bands as there are containers per row of containers to be thermoformed simultaneously in the forming chambers of a vertically moving molding unit of which the chambers are open upwardly and closed at their lower part with a bottom when said unit is in the high thermoforming position;

detaching at least partly a label from each individual band;

transporting each at least partly detached label to the corresponding forming chamber through an access opening the outline of which is homothetic to and slightly greater than that of the label and which is provided in the lateral wall of every forming chamber, said opening issuing onto the inner lateral face of said chamber and said lateral wall being in alignment with the lateral wall of the other chambers in the same row of chambers; and keeping the label close to the inner lateral face of the forming chamber until said label is attached to the container during the container thermoforming operation, this object is reached according to the invention in that:

the individual label bands are cut from a master band into a width identical to the width of the label, and the length of a one-step motion of each individual band is determined where the master band is cut longitudinally into individual bands, while every individual band is kept tensioned at least between two successive one-step motions;

the length of each individual band portion comprised between the longitudinal cutting area and the place of introduction of the individual band in the access opening of the corresponding forming chamber is kept constant despite the vertical displacement of the molding unit equipped with said chambers;

the band portion is guided downstream of a pair of introduction rollers provided under a longitudinal outer wall of the molding unit at the level of a forming chamber, through a vertical guiding slot opening into the bottom of the access opening, then the individual band portion is moved forward until a label occupies the whole vertical section of the access opening; and finally, the lower edge of the label occupying the access opening is completely separated from the rest of the individual band.

With this particular method, there are no scraps at the level of the access opening and the elements moving at that level can be reduced to a minimum. Also, the elements provided at the level or area of said access opening only perform limited movements and take up little room in the direction perpendicular to the plane containing the axes of the containers of one row of containers, so that the lateral distance between two successive rows of containers can be kept to a minimum.

The invention further relates to a device for producing and positioning a label on a thermoformed container from a thermoplastic band, of the type comprising, inside a station for the simultaneous thermoforming of at least one row of containers:

at least one row of upwardly open forming chambers, each chamber being associated to a bottom separate thereof, and being provided in a molding unit which is vertically movable, with respect to the bottom of the chamber, between a high thermoforming position in which the bottoms close off the lower end of the chambers and a low stripping position in which the top opening of the chambers is situated under the bottoms, and in which the row of thermoformed containers can be moved one step in a direction perpendicular to the plane containing the axes of the containers of one container row, one access opening being provided in the lateral wall of each forming chamber, and said lateral wall being aligned with the wall of the other chambers in the same row of chambers so that said access opening issues onto the inner lateral wall of said chamber;

a vertically movable supporting table, supporting the molding unit and being associated with control means for imparting a vertical reciprocating movement thereto between a high thermoforming position and a low stripping position;

one individual band of labels for every forming chamber, which band is guided on its path towards the forming chamber by at least one return and guiding roller and one pair of introduction rollers placed upstream of the access opening; and means of cutting at least partly the labels in order to detach them from their individual band.

Such a device is known for example from the Applicant's French Patent No. 2 256 013. In this case, the access opening is in the form of a passage slot through which the label is introduced, in that particular case, said label being shaped as a banderole which covers the whole cylindrical inner periphery of the forming chamber. This device does not permit the positioning of non-cylindrical, preferably flat or only slightly incurved labels over a fraction of the periphery of a container.

As indicated hereinabove, German Patent Application No. 1 704 091 describes a device for producing and positioning a flat or slightly incurved label on part of the lateral wall of a thermoplastic container, said device also being associated with a molding unit movable vertically between a high thermoforming position and a low stripping position. In this case, however, the labels are prefabricated and a stack of labels is housed in a lateral recess of the molding unit and issues onto a lateral face of the forming chamber, a plunger also placed in said recess pushing the stack forward of the thickness of a label after every container-forming operation, so that a new label presents itself on the lateral face of the forming chamber and is molded over by said container during the thermoforming of the latter. One major disadvantage of this particular embodiment resides in the fact that several labels may remain stuck together during the thermoforming of a container and during the adhesion of the first label to a lateral wall thereof. It can also happen that a label drops on the bottom of the forming chamber and is molded over by the container in that position.

Said German Patent Application No. 1 704 091 and U.S. Pat. No. 3,684,418 also describe a device for the production of labels from a label band and for the positioning of one label on a thermoformed container. The structure of these devices and their disadvantages have already been indicated hereinabove during the discussion of the known methods for producing and positioning labels.

It is another object of the present invention to propose a device for producing and positioning labels on thermoformed containers, device of the type defined hereinabove and which eliminates the above-stated disadvantages.

To this effect, the device for producing and positioning labels on thermoformed containers is characterized in that:

the access opening has, in vertical section, an outline which is homothetic to and slightly greater than that of a flat label, said opening comprising an upper face which constitutes an end-of-run abutment or stop for the free end of the label band and being connected with the outside via a guiding slot provided in the lateral wall of the molding unit, issuing onto the lower face of said access opening close to the inner face of the forming chamber and designed to receive the outermost part of the individual label band;

the return rollers and the pairs of introduction rollers are mounted on the molding unit supporting table, the contact zone between the two rollers of each pair of introduction rollers being situated opposite the inlet into the guiding slot and being aligned therewith;

the means for at least partly cutting the labels from one band of labels are provided in a zone situated between the pair of introduction rollers and the aperture of the slot guiding the band into the access opening; said device further comprising:

a storage roll of master-band mounted in fixed bearings, a cutting unit for cutting the master-band longitudinally into individual label bands of width equal to the width of the labels, a supporting table on which is installed the longitudinal cutting unit, which table is mounted for moving synchronous with the vertical displacements of the table supporting the molding unit, of the introduction rollers and of the guiding and return rollers, as well as, a tension roller provided on the path of the portion of master band between the storage roll and the longitudinal cutting unit, said tension roller being applied against the master band so as to compensate the length variations of said portion of master band which are due to the displacement of the longitudinal cutting unit.

Due to this particular design, the device according to the invention permits the production and positioning of labels on thermoformed containers, simultaneously, in at least one row of containers from a thermoplastic band, without there being any problem of removal of scraps and without the intervals between two successive containers being dependent on the overall dimensions of the different members or elements constituting the device according to the invention.

BRIEF DESCRIPTION OF THE DRAWINGS

The invention will be more readily understood on reading the following description with reference to the accompanying drawings in which:

FIG. 1 is an elevational view of a vertical section of the device according to the invention, taken along line I—I of FIG. 2, FIG. 2 is a diagrammatical plan view of the device according to the invention, FIG. 3 is a plan view of a horizontal section showing one detail of the device taken along line III—III of FIG. 1, FIG. 4 is a diagrammatical plan view of a horizontal section showing another detail of the device, through line IV—IV of FIG. 1, FIG. 5 is a front elevation of the detail shown in FIG. 4, FIG. 6 is an elevational view of a vertical section similar to that shown in FIG. 1 but showing yet another variant, FIG. 7 is a plan view of an individual label band having different forms of labels and different connection means between successive labels, FIG. 8 is a diagrammatical side elevation of the device shown in FIG. 1, FIG. 9 is a diagrammatical view showing a side elevation of another embodiment of the device according to the invention, FIG. 10 is a partly cross-sectional elevation of one detail, along line X—X of FIGS. 9 and 11, and FIG. 11 is a partly cross-sectional elevation of a detail, along line XI—XI.

DETAILED DESCRIPTION OF THE INVENTION

As illustrated in the drawings, the device for producing and positioning labels on at least one row of thermoformed containers comprises, inside a thermoforming station, a molding unit 1 mounted over and on a first horizontal supporting table 2 imparted with a reciprocating vertical up-and-down movement, so that the molding unit 1 is also movable with said table 2 between a high position, or thermoforming position, and a low position or thermoformed container stripping position. The containers are produced from a thermoplastic band 3 which moves inside a horizontal plane 4 and against the underpart of which rests the molding unit 1 when said unit is in the high position (see FIG. 1), said band 3 moving horizontally in the direction of arrow 5 perpendicularly to the plane 6 defined by the axes of the containers of one row of thermoformed containers.

The molding unit 1 comprises at least one row of forming chambers 7 (two rows in the example illustrated in the drawings) which are open upwardly, each one being associated to a horizontal bottom plate 8 separate from the molding unit 1 and mounted on a fixed vertical supporting rod 9, which goes through the supporting table 2 with a certain amount of lateral play.

The length of a vertical run of the molding unit 1 with its supporting table 2 is such that, in the high position of said molding unit 1, the bottoms or bottom plates 8 close off the lower end of the forming chambers 7 which, in the illustrated case, have the shape of an upside-down truncated cone or truncated pyramid and, in the low position, the upper opening of the chambers 7 is situated under the fixed bottom plates 8.

In the external lateral wall 10 of molding unit 1, which wall 10 is common to all the chambers 7 of one row of chambers, there is provided, opposite each chamber and preferably close to the upper opening thereof, an access opening 11 which issues onto a lateral face 12 of chamber 7 and which, in vertical cross-section parallel to the longitudinal vertical face 1a of molding unit 1, has an outline which is homothetic to that of a flat label 13 and slightly larger than the outline of said label. Said access opening 11, of which the axis is preferably perpendicular to or strongly inclined with respect to the vertical axis of the forming chamber 7, has an upper face 11a which constitutes an end-of-run abutment or stop for the free end of an individual label band 14 which, as will be seen hereinafter, is cut longitudinally from a master band 15. The lateral faces 11b of said access opening extend vertically and are spaced one from the other of a distance slightly greater than the width of the label, and the lower face 11c of said access opening 11 comprises the top inlet 16 of a guiding slot 17 of rectangular cross-section adapted to the width and to the thickness of the label band 14. Said guiding slot 17 extends preferably vertically inside the lateral wall 10 of molding unit 1 and, in the illustrated case, issues onto the lower horizontal face 1b of said molding unit 1.

A pair of introduction rollers 18, 19 of horizontal axes is provided under the guiding slot 17, the label and band 14 being pinched between rollers 18 and 19 of said pair of rollers, the contact zone of which is in line with guiding slot 17. Each pair of introduction rollers 18, 19, as well as the different return and guiding rollers 20 of vertical axis, associated to an individual label band 14, are mounted in bearings fast with supporting table 2.

Each individual label band 14 is cut longitudinally from a master band 15 containing a plurality of uncut individual bands. As can be seen for example in FIGS. 2 and 8, said master band 15 is rolled out from a storing roll 21 of horizontal axis mounted in fixed bearings 22 and situated at a certain lateral distance from molding unit 1, so that its axis is parallel to the moving direction 5 of thermoplastic band 3. The portion of master band 15 drawn from storage roll 21 passes first over a tension roller 23 borne by the end of a pivoting lever arm 24 of which the other end 25 is fixedly articulated, before it reaches a longitudinal cutting unit 26 which is composed of a lower pressing roller 27 with annular blades and an upper pressing roller 28 with annular counterblades, with, optionally, a return roller 29 bearing against the upper pressing roller 28, the master band 15 passing between these three rollers 27, 28, 29 in such a way as to surround the upper pressing roller 28 over an angle at least equal to 180°. It is the lower roller 27 which is moved stepwise and which determines the length of each one-step forward motion of all the individual bands 14 simultaneously, leaving the longitudinal cutting unit 26 after being cut longitudinally at a width equal to the width of the labels 13. The structure of the cutting unit 26 is normally a conventional one, such as for example that described in French Patents 2 034 915 and 2 403 177, to which reference can be made if necessary. The axes of rollers 27, 28, 29 of longitudinal cutting unit 26 are horizontal and parallel to the moving direction 5 of the thermoplastic band 3, so that individual bands 14 exiting from said unit 26 are situated inside a horizontal plane tangential to rollers 27, 28. On their path towards the forming chambers 7, individual bands 14 have to be twisted twice of 90° so that each one can be brought into the corresponding access opening 11. Said individual band 14 is first twisted of 90° between its exit from longitudinal cutting unit 26 and the first row of return rollers 20 of the vertical axis, said rollers 20 which are level with the horizontal extension of individual band 14 exiting from unit 26, are situated at an exiting distance from said unit 26 which is equal to at least eight times the width of individual band 14.

It is to be noted that the said row of return and guiding rollers situated downstream from the exit of longitudinal cutting unit 26 as well as said unit, are mounted on the same supporting table which is vertically movable synchronously with the vertical movements of supporting table 2 of molding unit 1. According to the embodiment illustrated in FIGS. 1, 2 and 8, the supporting table of longitudinal cutting unit 26 and that of molding unit 1 are rigidly bonded together so as to form the one and only supporting table 2.

However, instead of being integrated either in table 2 supporting molding unit 1, or independent thereof while remaining vertically in synchronism with said table 2, the supporting table of the longitudinal cutting unit 26 could be of different design as long as one condition is observed, which is that the length of the path of each individual band 14 between, first the exit from longitudinal cutting unit 26 or a unit ensuring and determining the length of the forward movement of each individual band, and second, the corresponding pair of introduction rollers 18, 19 remains constant despite the vertical displacements of the molding unit 1 and of the various pairs of introduction rollers mounted on the same supporting table 2.

According to the embodiment illustrated in FIGS. 9, 10 and 11, the supporting table 30 of the longitudinal cutting unit 26 and of the first row of return and guiding rollers 20 of vertical axes, is designed in the general form of a frame which is movable, in rotation about a fixed horizontal spindle 31 situated at the back of and close to the longitudinal cutting unit 26, and in translation in parallel to its longitudinal direction. To this effect, the side rails 30a of frame 30 are articulated at their front end situated close to the molding unit 1 on the supporting table 2 of the latter via vertical flanges 2a and two aligned horizontal pins 32 carried by the flanges 2a of supporting table 2 and by the bearing provided at the front ends of side rails 30a of frame 30. The front end 30e of each side rail 30a of support frame 30 is elbow-bent and, by its lower part, is joined with a frontal cross-piece 30b which is level with the supporting table 2 of molding unit 1 and which carries the first row of vertical return rollers 20, the height of which is about twice the vertical distance between said cross-piece 30b and the pivot pins 32 of frame 30 on the vertical flanges 2a of support plate 2. The other return rollers 20 being mounted on the supporting table 2, their central part is also level with the pivoting pins 32.

The articulation pin 31 of the rear end of support frame 30 which comprises also mounting plates 33 with bearings for shafts 27a, 28a, 29a of rollers 27, 28, 29 of the longitudinal cutting unit 26, is mounted in a fixed bearing 34 and is situated in a horizontal plane 35 which also contains the middle part of return rollers 20 and the pivoting axes 32 between supporting table 2 and support frame 30, when the molding unit 1 and consequently, its supporting table 2, are situated half-way between their high thermoforming position and their low stripping position. The rear end of side rails 30a of supporting frame 30 projecting from a rear cross-piece 30c is equipped with an oblong notch 30d which fits over the fixed articulation pin 31, so that the support frame 30 can pivot about said pin 31 upward and downward, and can move forward or backward with respect to said pin 31, when molding unit 1 and consequently the front end of support frame 30 which is joined to supporting table 2, moves towards its high thermoforming position or its low stripping position. It is to be noted that, given the structure of the embodiment described with reference to FIGS. 9 and 11, support frame 30 occupies its farthest back position with respect to fixed pin 31, when molding unit 1 is half-way between its high and low positions, and in which positions said frame 30 is in the farthest forward position with respect to fixed pin 31.

Other embodiments are also possible for the support frame 30 of the longitudinal cutting unit 26 and for the connection between support plate 30 and supporting table 2 of the molding unit 1. To this effect, reference could be made to the embodiments described in U.S. Pat. No. 4,734,026, filed June 8, 1987 and issued Mar. 29, 1988, which embodiments are in effect incorporated in the present patent application for reference purposes.

When a label 13 which is situated on the free end of label band 14, has been introduced through the vertical guiding slot 17, into access opening 11, said label should be detached from said band 14 so as to be removed together with the thermoformed container to which it has been attached by thermoforming.

A first means of separating the label is illustrated in the top righthand side of FIG. 1 and in FIG. 3.

Said first separation means comprises a plunger piston 36 housed behind aperture 16 of guiding slot 17 in an extension of access opening 11 which then issues, not only on the internal face 12 of forming chamber 7 but also on the external lateral face 1a of molding unit 1. Said plunger piston 36 is provided with a frontal lower cutting edge 37 which is adapted to cooperate with the opposite edge 38 of aperture 16 of slot 17 in order to separate from the label band 14 the first label 13 contained in access opening 11 and to move said cut-out label slightly forward, in the direction of the forming chamber. It is understood that, advantageously, in order to prevent the cut-out label from dropping into the forming chamber 7, said label should only be cut once the container thermoforming operation has been initiated and after fastening of at least the upper part of the label to the thermoplastic material of the container being formed.

The front face 36a of the plunger piston 36 can have the same inclination as lateral face 12 of the forming chamber 7, so that said lateral face 12 and the front face 36a of the plunger piston 36 are virtually aligned when the plunger piston is moved over aperture 16.

For a perfect cutting of label 13, the plunger piston 36, and in particular its cutting edge 37, must be applied without play against the horizontal lower face 11c of access opening 11. Advantageously, a plunger piston in iron or in steel is used to this effect, as well as a permanent magnet bar 39 embedded in the wall 10, so that one of its faces is flush with the lower face 11 c of access opening 11.

The lateral edges of the front face 36a of plunger piston 36 may be provided with guide rails 40 having a U-shaped cross-section open downwardly, or in some cases upwardly, and also in the direction of the other guide rail 40. In the waiting position of plunger piston 36, the lower end of guide rails 40 is situated just above the side edges of aperture 16 of guiding slot 17 so that the upper end of the band exiting from slot 17 is immediately gripped laterally by guide rails 40 and applied against the front face 36a of plunger piston 36.

By its rear face, plunger piston 36 is connected to elastic return means 41 such as draw springs, of which one end is fastened to a reference support such as a fastening plate 42 carried by the molding unit 1 at a small distance from the external vertical face 1a thereof. It is understood that said reference support could also be constituted by supporting rods anchored in the vertical face 1a of molding unit 1, on the one hand, and equipped at a small distance from said face with a hook on which is fastened the free end of the corresponding return spring 41, on the other hand. Between the rear face of plunger piston 36 and the reference support 42, there can be provided an actuating member 43 such as a finger carried by a cross-bar 44 situated between the vertical face 1a of unit 1 and the reference support 42, said bar 44 being optionally imparted with a vertical reciprocating movement so that finger 43 fast therewith is applied against a ramp 36b provided on the rear face of the plunger piston 36 and pushes the latter in the direction of forming chamber 7 or causes it to be returned to the retracted position behind aperture 16 under the effect of return springs 41.

In certain cases, it is advantageous to use labels of other shapes than rectangular. On the other hand, the individual bands 14 should retain a certain tensile strength which, among other things, depends on the width of the band 14 and, considering that the portion of label band comprised between the longitudinal cutting unit 26 and the pair of introduction rollers 18, 19 is liable to undergo tension jerks, due to the fact that the length of a one-step motion of the band 14 is determined by the longitudinal cutting unit, that said length of band is moved forward by introduction rollers 18, 19 of which the length of the periphery laid out by a forward motion operation, is greater than the length of one-step and that after a one-step forward displacement of band 14, said introduction rollers 18, 19 start to slip on said band 14, thereby applying tension thereon, it is advantageous to make a partial configurative cutting of the labels only after their passage between introduction rollers 18, 19. Indeed, it is on the path between the introduction rollers and access opening 11 that the label band 14 suffers no tensional stresses whatsoever, but only a thrusting force when the band 14 is moved forward.

According to one advantageous embodiment of the invention, there is provided between the pair of introduction rollers 18, 19 and the guiding slot 17, and to be more precise, the lower face 1b of molding unit 1, a partial stamping unit 45, comprising a stamping member 45a and a die 45b cooperating with said stamping member 45a and connected with a pipe for the discharge of the waste materials which pipe is bent downwardly and discharges into a waste collector 47 situated under said discharge pipe 46. The cuttings in label band 14 can have various shapes. For example, FIG. 7 illustrates cuttings in the form of triangles 48 or of narrow strips 49. In all cases, an uncut attachment zone 50 is left between two lateral cuttings 48 or 49, so as to ensure a junction between the successive labels 13 of the band 14. The attachment zone 50 will of course be subsequently broken at the level of access opening 11, for example with the help of cutting edges 37, 38 of plunger piston 36 and of aperture 16, respectively.

According to another embodiment of the invention, illustrated on the left-hand side of FIG. 1, the label separating means is a flat horizontal cutter 51 housed in a horizontal slot 52 provided in the side wall 10 of the molding unit 1, issuing into access opening 11 flush with the lower horizontal face 11c thereof and cooperating with the front edge 38 of upper aperture 16 of guiding slot 17, said front edge 38 acting as a counter-blade. In this case, there is no plunger piston and there is no final cutting of the label 13 required once this label has been partly seized by the thermoplastic material of the container being thermoformed. In order not to hinder the stripping of the container, the width of upper face 11a of access opening 11 is rather small. In certain cases, said upper face 11a may even be eliminated, so that the bottom face 11e of access opening 11 joins up directly with the lateral face 12 of forming chamber 7.

As illustrated in detail in FIGS. 4 and 5, the various cutters 51 are each associated with one access opening 11 and one aperture 16, and each one presents a cutting edge 51a which extends obliquely over the counter-blade 38 constituted by said aperture 16 of guiding slot 17, while remaining slightly set-off with respect to lateral face 12 of forming chamber 7. The various cutters 51 are interconnected by a plate 53 slidable longitudinally in slot 52, so that each cutter 51 can move over the entire length of aperture 16. A permanent magnet 39 is provided in front of each aperture 16, so that plate 53 and consequently and principally, cutters 51 which are fast therewith, are applied against the lower horizontal face 11c of access opening 11 and against counterblade 38. The longitudinal displacement of cutters 51 and of plate 53 in slot 52 is controlled from a double-acting jack 54 which is articulated, on the one hand, on the vertical face 1a of molding unit 1, and on the other hand, on the middle part of a lever 55 which, by its lower end, is articulated in 55a on the molding unit 1 and comprises, at its upper end, an oblong hole 55b in which is engaged an articulation and driving pin 53a which is fast with plate 53 and guided longitudinally by guiding blocks 56 provided on either side in slot 52.

The label separating means, instead of being provided at the level of upper aperture 16 of guiding slot 17, i.e. at the level of lower horizontal face 11c of access opening 11, could be situated in another part such as between the pair of introduction rollers 18, 19 and upper aperture 16. In this case, the vertical bottom 11e of access opening 11 is directly connected without any discontinuity with the rear face 17a of guiding slot 17 (see FIG. 6). Advantageously then, a partial separation of the labels from the label band is performed immediately downstream of the pair of introduction rollers 18, 19, keeping an attachment zone 50 preferably in the center and weakening said attachment zone 50 for example with a line of perforations 50a, so that said attachment zone 50 can be torn off by a simple longitudinal pull on the label band 14 during the stripping operation and after the fixing of the first top label 13 on a thermoformed container. It is indeed during the thermoforming of the container that the upper label is thermobonded on the container which rigidifies when coming into contact with the cold inner face of the forming chamber 7. During the stripping operation, the container remains on the fixed bottom plate 8 whereas the molding unit with the label band 14 is lowered. It is this downward movement which causes the separation between the label bonded to the container, and the rest of the label band 14, by tearing of the perforated zone 50a.

It is therefore possible to provide, downstream of the pair of introduction rollers 18, 19 and under aperture 16 at a distance corresponding to one step forward or to an integral multiple of such step, a stamping unit 45 or cutting unit 57 which, not only performs the partial cutting of the labels 13, but which also further weakens the attachment zone 50, 50a between two successive labels 13. In certain cases, it may be advantageous, in order to prevent the tearing up of the labels immediately below the label bonded on the container, to provide, under the upper aperture 16, a horizontal blocking piston 58 which issues into the guiding slot 17 and applies the upper part of the label engaged in guiding slot 17 against the opposite front face 17b thereof, during the stripping operation i.e. during the downward stroke of the molding unit 1.

The invention is in no way limited to the description given hereinabove and on the contrary covers any modifications that can be brought thereto without departing from its scope.

What is claimed is:

1. Device for the production and positioning of a label on a thermoformed container, using a thermoplastic band, said device comprising:

inside a thermoforming station including a molding unit having at least one lateral wall and at least one external lateral face, and in which at least one row of containers is simultaneously thermoformed, the axes of said containers defining a vertical plane, at least one row of upwardly open forming chambers, each said chamber having a lateral wall defining an inner face of the forming chamber and a lower end with a bottom, separate from said lateral wall, and being provided in said molding unit, said molding unit being vertically movable, with respect to the bottom of the chamber, between a high thermoforming position in which the bottoms close off the lower ends of the chambers and a low stripping position in which the top openings of the chambers is situated under the bottoms, and in which the row of thermoformed containers can be moved one step in a direction perpendicular to the plane containing the axes of the containers of one container row, one access opening being provided in the lateral wall of each forming chamber, and said lateral wall being aligned with the lateral wall of the other chambers in the same row of chambers so that said access opening issues onto the inner face of said chamber;

a first vertically movable supporting table, supporting the molding unit and having control means for imparting a vertical reciprocating movement thereto between a high thermoforming position and a low stripping position;

one individual band of labels for every forming chamber, each label of each band of labels having an upper part, and each band having a free end passing into the chamber through the access opening and an outer portion passing to the exterior of the molding unit, said band being guided on its path towards the forming chamber by at least one return and guiding roller and one pair of introduction rollers placed upstream of the access opening, said introduction rollers being arranged so as to create a contact zone therebetween; and means for at least partially cutting the labels in order to detach them from their individual band, wherein:

the access opening has, in vertical section, an outline which is homothetic to and slightly larger than that of a flat label, said opening comprising a horizontal upper face which constitutes an end-of-run abutment or stop for the free end of the label band, a horizontal lower face adjacent the inner face of the chamber, a vertical face forming part of the inner face of the chamber and a vertical bottom, said opening being connected with the exterior of the molding unit, via a horizontal guiding slot provided in the lateral wall of the molding unit, and having an inlet adjacent the introduction rollers, an aperture having an edge adjacent said opening, a rear face and an opposite front face, said guiding slot issuing onto the lower face of said access opening close to the inner face of the forming chamber and designed to receive an outer portion of the individual label band;

the return rollers and the pairs of introduction rollers are mounted on the molding unit supporting table, the contact zone between the two rollers of each pair of introduction rollers being situated opposite the inlet into the guiding slot and being aligned therewith;

the means for at least partially cutting the labels from one band of labels is provided in a zone situated between the pair of introduction rollers and the aperture of the slot guiding the band into the access opening;

said device further comprising:

a storage roll of master-band mounted in fixed bearings, a cutting unit for cutting the master-band longitudinally into individual label bands of width equal to the width of the labels, a second supporting table on which is installed the longitudinal cutting unit, which table is mounted for moving synchronous with the vertical displacements of the first table supporting the molding unit, the introduction rollers and the guiding and return rollers, and, a tension roller provided on the path of the portion of master-band between the storage roll and the longitudinal cutting unit, said tension roller being applied against the master-band so as to compensate the length variations of said portion of master band which are due to the displacement of the longitudinal cutting unit.

2. Device as claimed in claim 1, wherein the second supporting table of the longitudinal cutting unit is integral with the first supporting table of the molding unit.

3. Device as claimed in claim 1, wherein said second supporting table is separate from the first table supporting the molding unit but moves vertically in synchronism therewith.

4. Device as claimed in claim 1, wherein the longitudinal cutting unit and a row comprising the first row of the guiding and return rollers associated with each forming chamber are arranged such that the rotational axes of said rollers are in a vertical position, and wherein said rollers are situated downstream of said unit and are mounted on a supporting frame defining generally an open centered rectangular structure, extending longitudinally horizontally adjacent the molding unit and having an end close to the molding unit and an opposite end spaced from the molding unit, said supporting frame being movable, in rotation, about a fixed horizontal pin situated at the end thereof spaced from the molding unit and close to the longitudinal cutting unit, and in translation in parallel to the longitudinal extending direction of the rectangular frame structure, the end of said rectangular frame structure situated close to the molding unit being a front end and being articulated on the first supporting table of the molding unit by articulation pins.

5. Device as claimed in claim 4, wherein an articulation pin associated with the end of the supporting frame spaced from the molding unit is mounted in a fixed bearing and is situated inside a horizontal plane which also intersects the vertical rotational axis of the row of first return rollers at mid-height of said rollers, said horizontal plane also containing the articulation pins between the first supporting table and the supporting frame when the molding unit is half-way between said high thermoforming position and said low stripping position.

6. Device as claimed in claim 1, wherein the access opening comprises an extension which issues onto the external lateral face of the molding unit and comprises a plunger piston having lateral edges and a lower frontal edge defining a cutting edge adapted to cooperate with an opposite edge of the aperture of the guiding slot.

7. Device as claimed in claim 1, wherein said means for at least partially cutting the labels is provided between the pair of introduction rollers and the guiding slot for the partial cutting of the label band.

8. Device as claimed in claim 1, wherein a horizontal flat cutter is associated with each forming chamber and is housed in a horizontal slot provided in the lateral wall of the molding unit and issues into the access opening flush with the horizontal lower face thereof, said horizontal slot cooperating with the edge of the aperture of the guiding slot for separating from the label band, the label contained in the access opening.

9. Device as claimed in claim 8, wherein said horizontal cutters are each provided with an oblique cutting edge and are interconnected by a flat piece sliding longitudinally in said horizontal slot.

10. Device as claimed in claim 1, wherein the vertical bottom of the access opening is directly joined without any discontinuity to the rear face of the guiding slot.

11. Device as claimed in claim 1, wherein a blocking piston is provided below the aperture of said guiding slot, said piston issuing thereinto and being adapted to apply the upper part of the label engaged in said slot against the opposite front face of the slot.

12. Device as claimed in claim 6, wherein the lateral edges of the plunger piston are equipped with guide rails.

* * * * *